(12) United States Patent
Dally

(10) Patent No.: US 11,230,866 B2
(45) Date of Patent: Jan. 25, 2022

(54) BEARING AND COUPLER-JOURNAL DEVICES FOR PANELS

(71) Applicant: SUN AND STEEL SOLAR LLC, Stateline, NV (US)

(72) Inventor: Robert B. Dally, Stateline, NV (US)

(73) Assignee: Sun and Steel Solar LLC, Stateline, NV (US)

( * ) Notice: Subject to any disclaimer, the term of this patent is extended or adjusted under 35 U.S.C. 154(b) by 0 days.

(21) Appl. No.: 16/363,288

(22) Filed: Mar. 25, 2019

(65) Prior Publication Data

US 2019/0292823 A1    Sep. 26, 2019

Related U.S. Application Data

(60) Provisional application No. 62/648,546, filed on Mar. 27, 2018, provisional application No. 62/647,778, filed on Mar. 25, 2018.

(51) Int. Cl.
| | |
|---|---|
| *E05D 5/06* | (2006.01) |
| *E05D 7/081* | (2006.01) |
| *E05D 5/14* | (2006.01) |
| *E05D 7/10* | (2006.01) |

(52) U.S. Cl.
CPC ............ *E05D 5/06* (2013.01); *E05D 5/14* (2013.01); *E05D 7/081* (2013.01); *E05D 7/1044* (2013.01)

(58) Field of Classification Search
CPC ... F16L 3/24; F16L 51/00; F16L 57/06; F16L 3/1222; F16L 3/1066; F16L 3/1091; F16L 1/0246; F16F 15/08; E05D 5/06; E05D 5/14; E05D 7/081; E05D 7/1044; F16B 1/00; E02D 5/223; F24S 25/00

USPC ... 248/65, 73, 74.4, 74.5, 230.5, 231.61, 63, 248/62, 69, 72; 188/268, 33, 36; 285/373, 411, 419, 420; 292/256; 136/246
See application file for complete search history.

(56) References Cited

U.S. PATENT DOCUMENTS

| | | | | |
|---|---|---|---|---|
| 2,425,033 | A * | 8/1947 | Fletcher | F16L 3/227 248/68.1 |
| 3,048,177 | A * | 8/1962 | Takaro | A61B 17/11 606/153 |
| 3,227,406 | A * | 1/1966 | Shelton | F16L 3/1091 248/74.4 |
| 5,540,465 | A * | 7/1996 | Sisk | F16L 17/04 285/112 |
| 6,142,428 | A * | 11/2000 | Kamata | F16L 3/1207 248/49 |

(Continued)

FOREIGN PATENT DOCUMENTS

| | | | | |
|---|---|---|---|---|
| CA | 2813917 | A1 * | 5/2012 | F16L 3/16 |
| CN | 103727313 | A * | 4/2014 | F16L 3/1075 |

(Continued)

*Primary Examiner* — Kimberly T Wood
(74) *Attorney, Agent, or Firm* — Sherman IP LLP; Kenneth L. Sherman; Steven Laut

(57) ABSTRACT

A journal-coupler includes a first portion including a first pair of flanges and a first coupler portion and a second portion that is removably connected to the first portion. The second portion includes a second pair of flanges and a second coupler portion. The first coupler portion and the second coupler portion combine to form an enclosed torque tube portion.

20 Claims, 17 Drawing Sheets

(56) References Cited

U.S. PATENT DOCUMENTS

| | | | | |
|---|---|---|---|---|
| 6,234,541 | B1* | 5/2001 | Wagner | F01N 13/1805 24/277 |
| 6,305,719 | B1* | 10/2001 | Smith, Jr. | F16L 55/175 285/15 |
| 8,230,883 | B2* | 7/2012 | Takeshita | F16L 3/1091 137/797 |
| 9,038,968 | B2* | 5/2015 | Hennon | F16L 3/1091 248/65 |
| 9,303,684 | B2* | 4/2016 | Clavijo Lumbreras | F24S 30/425 |
| 10,320,326 | B2* | 6/2019 | Schimelpfenig | H02S 20/32 |
| 10,557,588 | B2* | 2/2020 | Chiproot | F16L 55/172 |
| 2012/0217353 | A1* | 8/2012 | Hennon | F16L 55/035 248/67.5 |
| 2013/0048798 | A1* | 2/2013 | Bock | F16L 3/1091 248/67.5 |
| 2014/0346291 | A1* | 11/2014 | Booth | F16L 3/1091 248/74.4 |
| 2017/0108145 | A1* | 4/2017 | Alquier | F16L 3/10 |
| 2018/0023729 | A1* | 1/2018 | Alquier | F16L 3/1207 248/74.4 |
| 2018/0062565 | A1* | 3/2018 | Schimelpfenig | F24S 30/425 |
| 2019/0292824 | A1 | 9/2019 | Dally | |
| 2020/0010037 | A1* | 1/2020 | Davenport | F16L 3/1091 |

FOREIGN PATENT DOCUMENTS

| | | | | |
|---|---|---|---|---|
| DE | 3827662 | A1* | 2/1990 | F16L 59/135 |
| EP | 2730830 | A1* | 5/2014 | F16L 3/2235 |
| EP | 3537019 | A1* | 9/2019 | F16L 3/1091 |
| EP | 3406952 | B1* | 11/2019 | F16B 9/052 |
| KR | 20110048497 | A* | 5/2011 | F24S 25/10 |

\* cited by examiner

US 11,230,866 B2

BEARING AND COUPLER-JOURNAL DEVICES FOR PANELS

CROSS-REFERENCE TO RELATED APPLICATIONS

This application claims the priority benefit of U.S. Provisional Patent Application Ser. No. 62/647,778, filed Mar. 25, 2018 and 62/648,546, filed on Mar. 27, 2018, which are both incorporated herein by reference in their entirety.

TECHNICAL FIELD

One or more embodiments relate generally to devices for rotational panels, and in particular, bearing and coupler-journal devices for supporting rotational panels.

BACKGROUND

Single axis trackers are mounting structures used for the controlled movement of photovoltaic solar panels and other solar collecting means from east to west to track the sun daily.

SUMMARY

Some embodiments provide bearing and coupler journal devices for supporting rotational panels. One embodiment includes a journal-coupler that includes a first portion including a first pair of flanges and a first coupler portion and a second portion that is removably connected to the first portion. The second portion includes a second pair of flanges and a second coupler portion. The first coupler portion and the second coupler portion combine to form an enclosed torque tube portion.

These and other features, aspects and advantages of the one or more embodiments will become understood with reference to the following description, appended claims, and accompanying figures.

DETAILED DESCRIPTION

Figure 1A:
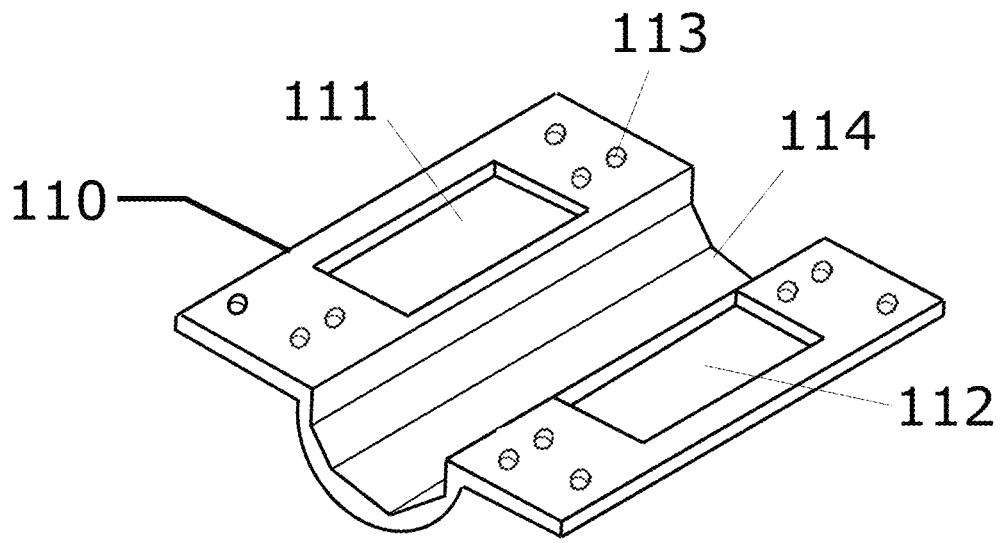
FIG. 1A shows a first portion of a coupler-journal, according to some embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments relate generally to devices for rotational panels, and in particular, bearing and coupler-journal devices for supporting rotational torque tubes for solar panels. One embodiment provides a journal-coupler that includes a first portion including a first pair of flanges and a first coupler portion and a second portion that is removably connected to the first portion. The second portion includes a second pair of flanges and a second coupler portion. The first coupler portion and the second coupler portion combine to form an enclosed torque tube portion.

Some embodiments are directed to an apparatus that is both a mechanical coupler and a rotating journal. In one embodiment, the device includes two halves that connect together (e.g., via bolts, fasteners, welding, etc.), clamping around multi-sided torque tube axles (e.g., butted end-to-end, or closely end-to-end, etc.), and connecting the torque tubes together and transferring the axial torque from one torque tube to the next. In one embodiment, the outside surface of the central body forms a cylindrical journal that turns inside a bearing (e.g., a round, circular, multifaceted, etc.) surface, establishing a bearing for the rotating torque tubes. In one example embodiment the metal-to-metal, round-to-round interface between the electrically conductive device and the electrically conductive bearing establishes a continuous ground path. The three functions of coupling together two torque tubes, performing as a journal in a bearing, and providing an electrical ground path are necessary for single axis tracking systems used on solar photovoltaic power plants.

It should be noted that most conventional single axis trackers utilize a coupling mechanism to connect many load-carrying axle segments or torque tubes end-to-end to form an axle on which solar panels are mounted and rotated to track the sun in a single axis direction. All single axis trackers must have each of their electrically conductive parts electrically grounded to earth ground. The torque tube system is the main grounding trunk for collecting the ground from the metal frames of the attached solar panels, the solar panel mounting hardware, and the mounting posts or piers. Plastic bushings typically used within the bearing system electrically isolate the posts or piers from the torque tubes, necessitating a flexible grounding strap from each and every non-moving post or pier to the grounded, rotating torque tube system.

Conventional systems use conventional bearings, couplers, and grounding straps independently, constituting three distinct parts. Most conventional trackers utilize a torque tube coupling system for connecting torque tubes end-to-end that is separate and independent from the bearing, located a distance away. This constitutes two distinct parts of the coupler and the bearing to perform two distinct functions. Some conventional systems use a shaft journal with a flange at each of the two ends of the shaft, each flange having a bolt hole pattern to connect a torque tube on either end, which also have similar flanges. This design adjoins two adjacent torque tubes to complete the torque tube axle system. This design, while utilizing a single part to perform the two functions of a simple bearing journal and a torque tube coupler, requires the addition of mating flanges onto the ends of the torque tubes.

Most conventional systems include a plastic sleeve as a bushing between the journal and the bearing to prevent metal-to-metal rubbing and thus increase the number of parts. The plastic bushing is electrically non-conductive and electrically isolates the metallic journal from the metallic bearing for preventing a ground path from each post to the torque tube and thus, requiring a separate, field applied, flexible ground wire between the post and the rotating, grounded torque tube (increasing the parts count). This ground strap must flex and survive approximately 22,000 flexes from the daily east to west rotation over a typical thirty year life span of a solar utility plant. This added ground wire at each and every post requires terminal studs to be attached, usually by field welding, to the posts and to the torque tubes at each post location, to function as terminals onto which the ground wires are to be attached. Note that the fabrication of the ground wire, the field welding attachment of the two studs at each and every post location, the cleaning of the weld-induced burned galvanization followed up with an application of zinc rich paint, followed by torque wrench tightening of the two ring terminals of the ground wire to the two studs incorporates much labor and much human and field condition variability that brings into question consistency, quality, durability, and reliability of those ground paths.

Plastic bushings or plastic wear surfaces placed in between the turning journal and the stationary bearing are assumed to be required because of various fears about a metal-on-metal simple bearing. Some of these fears are that: there will be much friction requiring much turning torque; the system will squeak or make noise when turning; the metal interface will rust once the galvanization is worn away; and the rubbing metal components will wear thin and eventually fail mechanically. Note that square torque tubes used as couplers have been used as the journal inside a round simple bearing. The two relatively small surface areas of the two bottom corners of the square torque tube suffer from excessive wear caused by their excessive surface pressure during rotation. The primary reason for plastic bushings is to distribute the weight, and hence pressure, away from the small area of the two corners of a square torque tube to the much broader area of the round surface area typical in a round bearing system. One disadvantage of the plastic bushing is that they can break, especially if deployed improperly. Plastic can make a strong and durable wear surface but does not work well as a structural element used as a moving part that must withstand cyclic stress, such as would be the case of a rotating plastic bushing in a simple bearing system on a single axis tracker that must withstand an approximate 22,000 cycles of cyclic stress resulting from the shifting weight of the tracking solar panels, from various wind events, and from decades of thermal expansion and contraction of the long torque tube axle.

Many of the conventional single axis tracker systems have bushings and journals that must be placed onto the torque tube prior to field assembly. For example, a fully round journal, a fully round bushing, and a fully round bearing can only be installed from the ends of the torque tube and therefore must be slid onto the torque tubes before the torque tubes are coupled together. Sometimes, if the workers are not 100% careful, a bushing or journal can be inadvertently turned by one facet of the torque tube and the error is not discovered until the system is ready for commissioning, at which point the entire assembly around that error must be disassembled in order to correct the error, which involves sliding the components off the end of the torque tube, rotating the component in correct alignment, and then sliding the components back on to the torque tube.

Some conventional single axis trackers utilize a one piece bearing component, and some single axis trackers utilize two bearing components, a bottom and a top, that are bolted together and by which the bolt provides all the holding strength to keep the top bearing component affixed to the bottom bearing component when a force is placed on the top bearing component (as a result of angular rotation of the solar panels or an upward wind force placed onto the solar panels, both of which place a force on the torque tube and journal that turns inside the bearing).

Some embodiments provide steel-on-steel friction that is relatively low, especially after the rubbing surfaces become shiny smooth over time. Movement is silent because the rotation is slow, is limited to approximately 90 degrees of rotation throughout the daylight hours, and is infrequent as it turns and stops in small increments. The metal interface is effectively wiped twice a day, keeping both surfaces of bearing and journal rust free, shiny, smooth, and electrically conductive. In some embodiments, the large surface area of the cylindrical journal against the large cylindrical bearing surface minimizes the interface pressure and minimizes the wear. The wall thicknesses of the journal and the bearing are both sufficiently thick to survive and function structurally for the life of the system.

Some embodiments provide advantages over the conventional systems and components, such as: (a) providing a clamp-on coupler for the torque tubes of a single axis tracker that also performs the function of a round journal in a simple bearing for the turning torque tubes; (b) providing a clamp-on journal for a single axis tracker that provides a thick, round gliding interface that maximizes the surface area to the simple bearing; (c) providing a method of electrically grounding the simple bearing, and hence the post on which it is firmly attached, to the journal and hence to the torque tube that is clamped together with the coupler-journal, accomplished principally by the relatively large metal-to-metal contact surface areas of the cylindrical journal and the round bearing; (d) providing a coupling method that doubles as a journal that adjusts without having to be slid off of, and back on to, the torque tube from the ends of the torque tubes, which simplifies adjustment, rework, and replacement; (e) providing a clamp-on journal that can be used on a single torque tube to function solely as a journal in a simple bearing to support that torque tube; (f) providing a clamp-on journal that can be used on a single torque tube to function solely as a ground path for that torque tube; and (g) providing an integral grounding path and method without having to add any additional hardware such as a ground strap or a ground wire and attachment devices for a ground strap or ground wire.

One or more embodiments have a configuration of metal-on-metal simple bearing that: has a relatively low coefficient of friction between steel and steel; does not squeak because the rotation is very slow and infrequent; will not rust at the simple bearing interfaces because said interface is automatically/dynamically wiped clean daily during movement and maintains a shiny, rust-free surface; will not wear out and fail within the approximate thirty-year life for at least three reasons: (a) the surface contact area is sufficiently large so as to significantly reduce the contact pressure and significantly reduce the rate of wear; (b) the turning action happens only about 22,000 times over the course of a thirty-year operational life; and (c) the thicknesses of the journal and of the simple bearing are sufficient enough to have the required structural strength over the intended life of the system.

It should be noted that low prices for renewable energy mandate that cost savings be achieved in the material cost, the installation cost, and the operation and maintenance (O&M) cost. Material costs can be and are reduced by having fewer parts, which can be achieved by having one part to perform multiple functions. Therefore, some embodiments include a coupler-journal that performs as a coupler to hold together two adjacent torque tubes end-to-end and also performs as a journal in a simple bearing system to allow the torque tubes to rotate. Material costs can also be reduced by removing the need for a separate ground strap at each and every post via the effective electrical ground commutation process of the simple bearing system.

Installation costs can be and are reduced by having fewer parts to install, such as combining a coupler and a journal into one part. Further reductions in installation labor can be realized by not having to apply a ground strap in the field at each and every post of which must electrically connect the stationary post to the rotating torque tube. O&M costs are reduced by having fewer parts to inspect, maintain, repair, or replace. In some embodiments, this cost is further reduced by having a bolt together system that can be unbolted for easy adjustment or replacement in the field.

Some embodiments include a specialized coupler that performs also as a journal in a simple bearing system, and if all system parts are electrically conductive then the system also performs as a continuous ground path. One or more embodiments provide: a coupler to join two torque tubes end-to-end; a journal coincident with the coupler that turns inside a simple bearing and that does not require a bushing; and a journal in a simple bearing system that maintains a continuous ground path. In one example embodiment, the same coupler that connects two torque tubes end-to-end via clamping also performs as a journal in a simple bearing system via its smooth, cylindrical outer surface, with enough surface area to minimize pressure and wear; and with enough constant, conductive contact area to also perform as an integral ground path. In some embodiments, the length of each torque tube is the same as the distance between the supporting posts such that two adjacent torque tubes butt-up against each other centrally over the coupler, which provides the coupler to also serve as a journal centered in a bearing. In one or more embodiments, there are no intermediary bushing of plastic, metal or any other material. In some embodiments, a metal journal turns inside a metal bearing to form a simple bearing. The metal-on-metal contact between the two (e.g., circular) surfaces, aided by the weight of the torque tubes and the weight of solar panels supported by the torque tubes, creates a constant ground path between the journal and the bearing. In one or more embodiments, the outer journal surface of the coupler-journal is cylindrical so as to give maximum surface area of contact to the circular bearing surface, thus minimizing the pressure on both interfacing surfaces of the coupler-journal and the bearing. In one or more embodiments, the coupler's inner surface may be faceted in the same shape and approximate dimensions of the multi-sided torque tube, therefore capable of clamping the two butting torque tubes together and transferring the torque from one torque tube to the adjoining torque tube while keeping the abutting torque tubes in axial and rotational alignment. In some embodiments, the coupler's inner surface is non-faceted in the same non-faceted shape and approximate dimensions of a round torque tube, therefore being capable of clamping the two abutting torque tubes together and transferring the torque from one torque tube to the adjoining torque tube while keeping the abutting torque tubes in axial and rotational alignment. The thickness of the material between the outer round surface of the journal and the inner faceted or non-faceted surface of the coupler is of sufficient to transfer the calculated torque from one torque tube to the next for the life of the tracker system while taking into account lifetime wear.

Figure 1B:
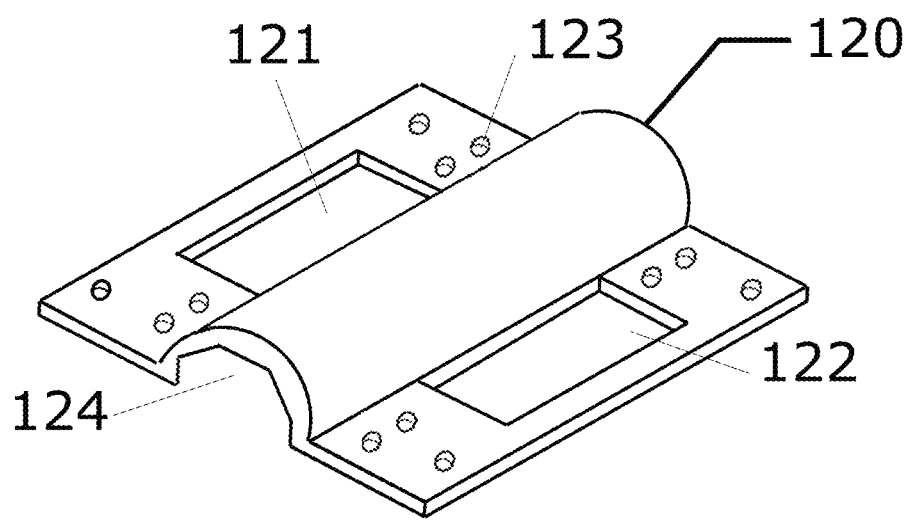
FIG. 1B shows a second portion of a coupler-journal, according to some embodiments.

FIG. 1A shows a first portion 110 of a coupler-journal, according to some embodiments. FIG. 1B shows a second portion 120 of a coupler-journal, according to some embodiments. In some embodiments, the first portion 110 and the second portion 120 are two identical coupler-journal halves, each including a half central body (e.g., cylindrically shaped, multi-faceted shaped, etc.) with two flanges, one on each side of the central body. In one or more embodiments, the first portion 110 includes a first opening (or cutout, window, etc.) 111 and a second opening (or cutout, window, etc.) 112; and the second portion 120 includes a third opening (or cutout, window, etc.) 121 and a fourth opening (or cutout, window, etc.) 122. The first portion 110 includes through-holes (or fastening openings) 113; and the second portion 120 includes through-holes (or fastening openings) 123. The first portion 110 includes a torque tube 720 (see, e.g., FIG. 7) cradle or coupler portion 114; and the second portion 120 includes a torque tube 720 cradle or coupler portion 124.

Figure 2:
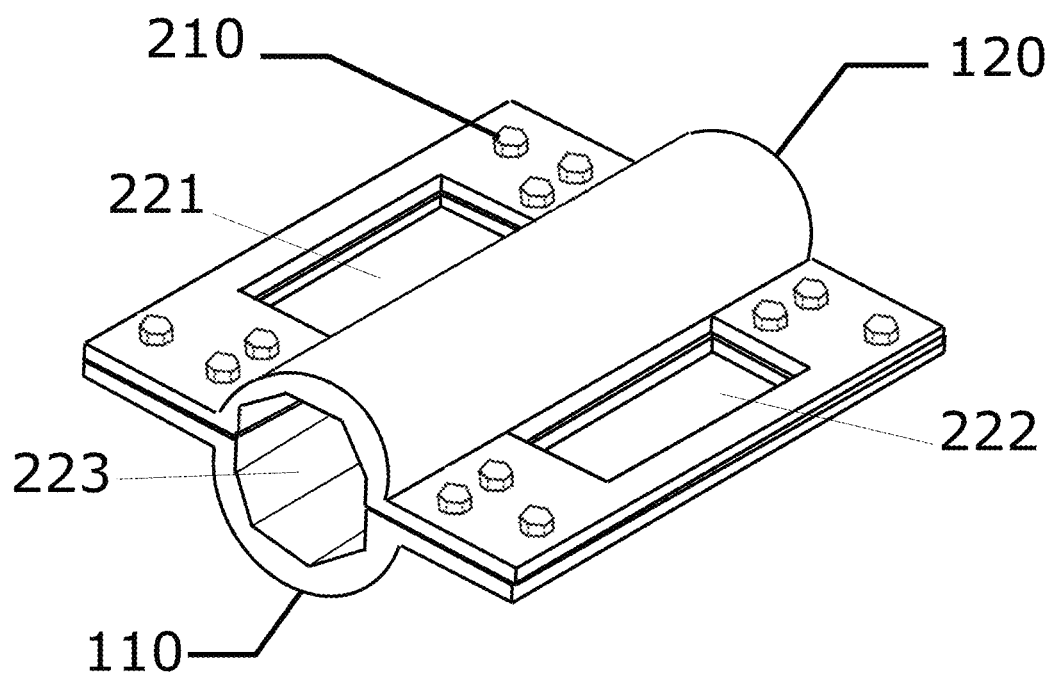
FIG. 2 shows a coupler-journal including the first portion (FIG. 1A) and the second portion (FIG. 1B), according to some embodiments.

In some embodiments, when the first portion 110 and the second portion 120 are fixed together (e.g., using nuts and bolts, bolts, machine screws, any other fastening devices or techniques) they form a complete coupler-journal unit (see, e.g., FIG. 2). Each side of the first portion 110 and the second portion 120 form a flange that each has a centralized cutout (first opening 111, second opening 112, third opening 121, fourth opening 122) close to the central body to avoid interference with the bearing. The flanges have the through-holes 113/123 for coupling together the two coupler-journal halves (first portion 110 and the second portion 120). In one or more embodiments, the body of each of the first portion 110 and the second portion 120 coupler-journal halves forms a half "cylinder," where the outside surface, or a central portion of the outside surface, is rounded and smooth to function as the round journal surface, which rests and turns inside a bearing. In some embodiments, the interior surface of the central body of the first portion 110 and the second portion 120 coupler-journal halves is faceted in the same approximate size and form to snuggly mate against half of a multi-sided torque tube 720 or two adjoining multi-sided torque tubes 720.

In one or more embodiments, the first portion 110 and the second portion 120 are made of a metal, a metal alloy, an electrically conductive plastic, etc. In some embodiments, the first portion 110 and the second portion 120 may be sized and have a particular thickness according to the diameter and sizing of torque tube 720 that is required for a particular sized solar panel.

FIG. 2 shows a coupler-journal including the first portion 110 (FIG. 1A) and the second portion 120 (FIG. 1B), according to some embodiments. In one example embodiment, the first portion 110 and the second portion 120 are fixed together with fasteners 210 (e.g., bolts, nut and bolts, screws, etc.) and form combined windows 221 and 222, and the enclosed portion 223 for a torque tube 720 (FIG. 7). In some embodiments, the coupler-journal formed by the first portion 110 and the second portion 120 performs multiple functions such as: a coupler for connecting two torque tubes 720 end-to-end, a coupler-journal that rotates in a simple bearing system, and an electrical path for electrical grounding between the coupler-journal and a bearing formed by lower bearing portion 310 and upper bearing portion 315 (see, e.g., FIGS. 11A-B, 12A-B, 13, 14A-B, 15 and 16).

In some embodiments, continuous contact, pressure, and wiping back and forth between the outer journal-coupler surface (outer surface of first portion 110 and second portion 120) and the interior surface of the lower bearing portion 310 and the upper bearing portion 315 that form a simple bearing, sustains a continuous electrical ground path between the journal-coupler, the torque tubes 720 (FIG. 7) and the bearing formed by the lower bearing portion 310 and the upper bearing portion 315.

In one or more embodiments, the combined windows 221 and 222 provide cutout clearance for turning the journal-coupler within the bearing. The flanges of the first portion 110 and the second portion 120 also function as physical stops at the two extreme rotational limits of the turning torque tube, and thus may be sized according to the required rotational angle limits.

In some embodiments, for each coupler-journal half (the first portion 110 and the second portion 120) the body is the approximate shape of a half-cylinder, with the outside surface being smooth and rounded to perform as the journal surface, while the inside concave surface of the body has facets that match the form, size, and angles of the multi-sided torque tube 720 (FIG. 7) and are the coupling or holding surface. In one or more embodiments, the wall thickness of the cylindrical shaped body, is the distance between the outer round surface and the inner concave surface facet-to-facet joint, and is thick enough to perform as a journal in the simple bearing system formed between the lower bearing portion 310 and the upper bearing portion 315 for the intended multi-decade life span for which it is intended. For example, performing as a journal in a simple bearing for a horizontal single axis tracker which rotates back and forth every day for perhaps thirty years, constituting approximately twenty-two thousand wipes. The wall thickness is also sufficient enough to transfer the torque from one torque tube 720 to the next torque tube 720.

In one or more embodiments, the outside round/circular bearing surface maximizes the surface contact to the bearing to minimize pressure at the bearing interfaces, and therefore minimizing wear on journal-coupler and the bearing, and therefore performing as the journal in a simple bearing system.

In some embodiments, the two flanges on opposite sides of the body of each of the first portion 110 and the second portion 120 serve the multiple purposes of clamping the two halves of the journal-coupler together, therefore coupling and holding in place the two end-to-end torque tubes 720 (see, e.g., FIGS. 7B, 8B, 9B, 10B, 11B and 12B) for transferring the torque from one torque tube 720 to the next torque tube 720, and of abutting against the shoulders of the mounting plate of the simple bearing formed between the upper bearing portion 315 and the lower bearing portion 310) to help stop and support the torque tubes 720 at their intended limits of rotation in both a clockwise and counter-clockwise direction (e.g., when driven by, for example, a motor for rotating the torque tubes 720).

Figures 3A, 3B:
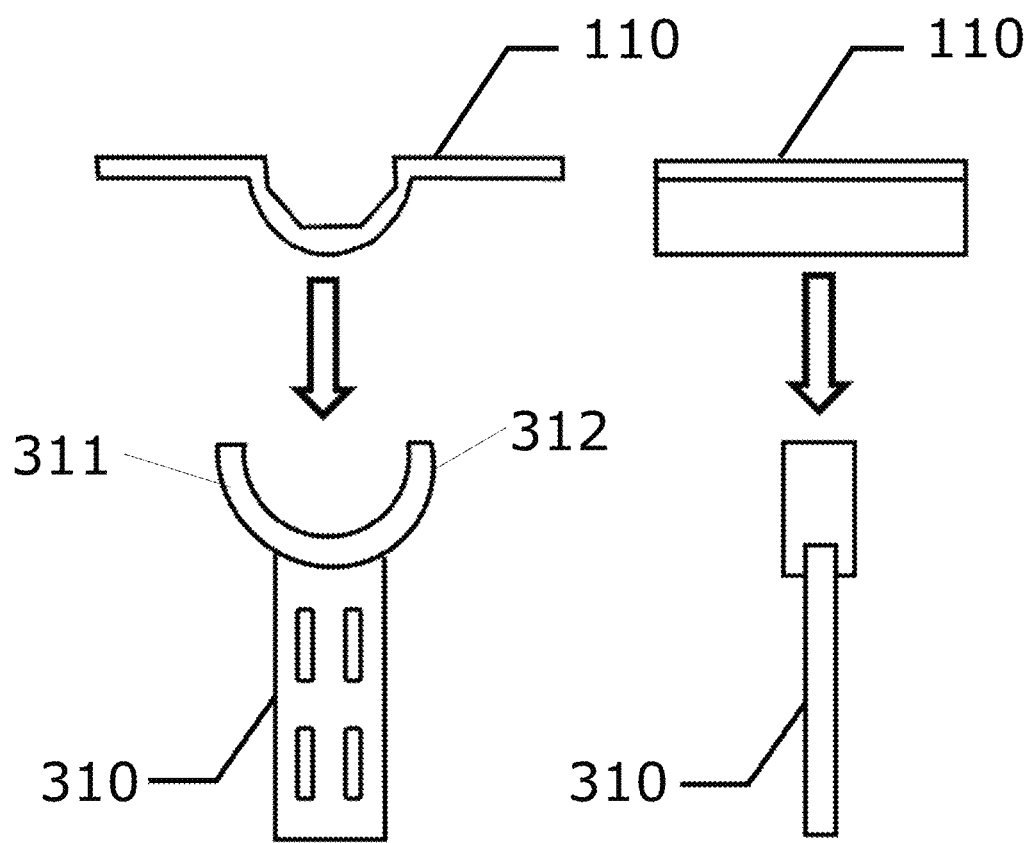
FIG. 3A shows a front view of the first portion of the coupler-journal being placed into a lower bearing portion, according to some embodiments.
FIG. 3B shows a side view of the first portion of the coupler-journal being placed into the lower bearing portion, according to some embodiments.

FIG. 3A shows a front view of the first portion 110 of the coupler-journal being placed into the lower bearing portion 310, according to some embodiments. FIG. 3B shows a side view of the first portion 110 of the coupler-journal being placed into the lower bearing portion 310, according to some embodiments. As shown, the first portion 110 of a coupler-journal half with its faceted concave inner surface facing up being lowered in the direction of the arrow into the semi-circular bearing surface of the lower bearing portion 310. In one or more embodiments, the round outer surface of the body of the first portion 110 of the coupler-journal mates with, sits and rotates against the round bearing surface of the lower bearing portion 310.

Figure 4:
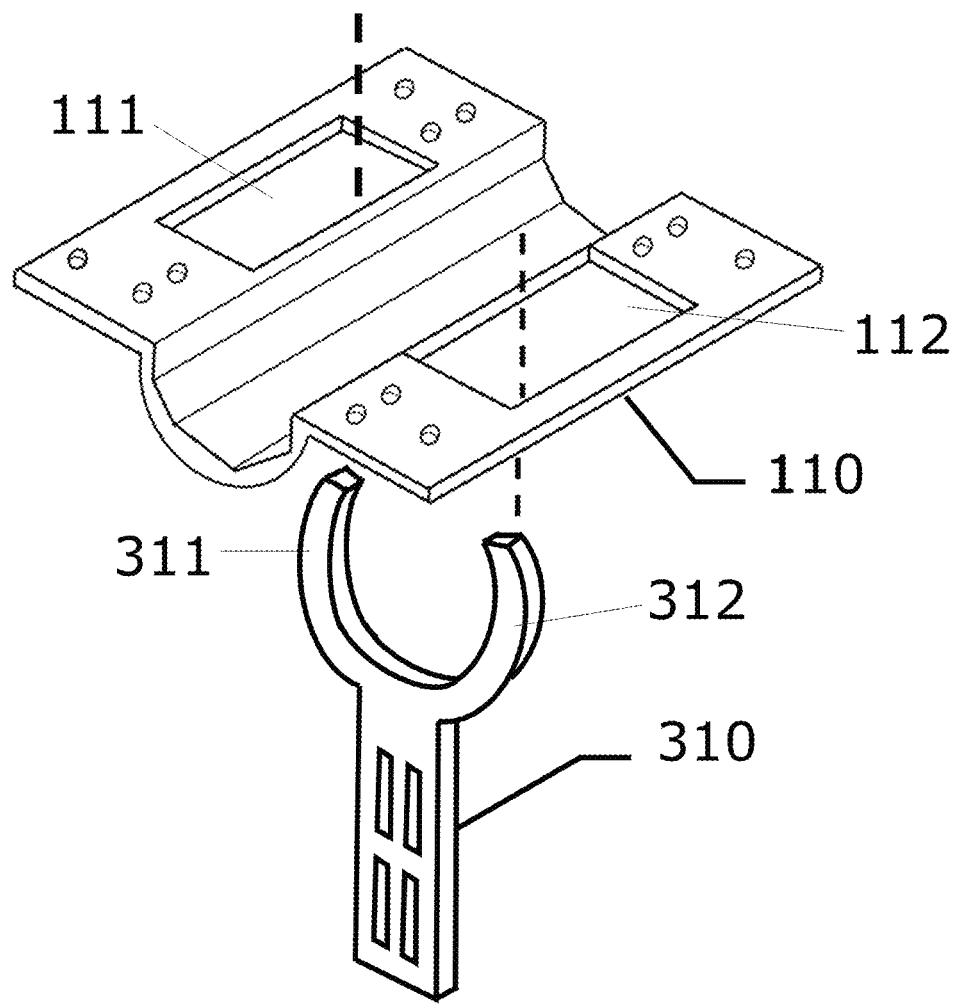
FIG. 4 shows a perspective view of the first portion of the coupler-journal placement into the lower bearing portion, according to some embodiments.

FIG. 4 shows a perspective view of the first portion 110 of the coupler-journal placement into the lower bearing portion 310, according to some embodiments. In some embodiments, the upright prongs 311 and 312 of the lower bearing portion 310 pass through (following the path of the dashed lines) the first opening 111 and the second opening 112 in the two flanges of the first portion 110 of the coupler-journal.

Figure 5A:
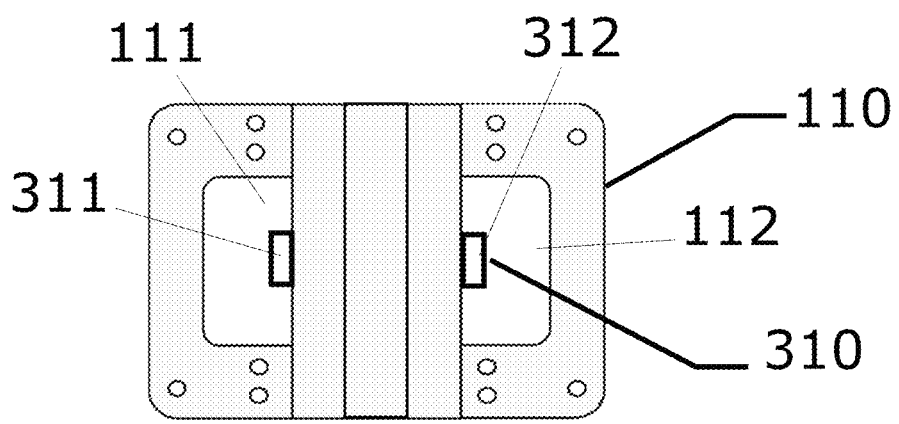
FIG. 5A shows a top view of the first portion of the coupler-journal coupled with the lower bearing portion, according to some embodiments.

FIG. 5A shows a top view of the first portion 110 of the coupler-journal coupled with the lower bearing portion 310, according to some embodiments. As shown, the upright prongs 311 and 312 can be seen from the respective first opening 111 and the second opening 112.

Figures 5B, 5C:
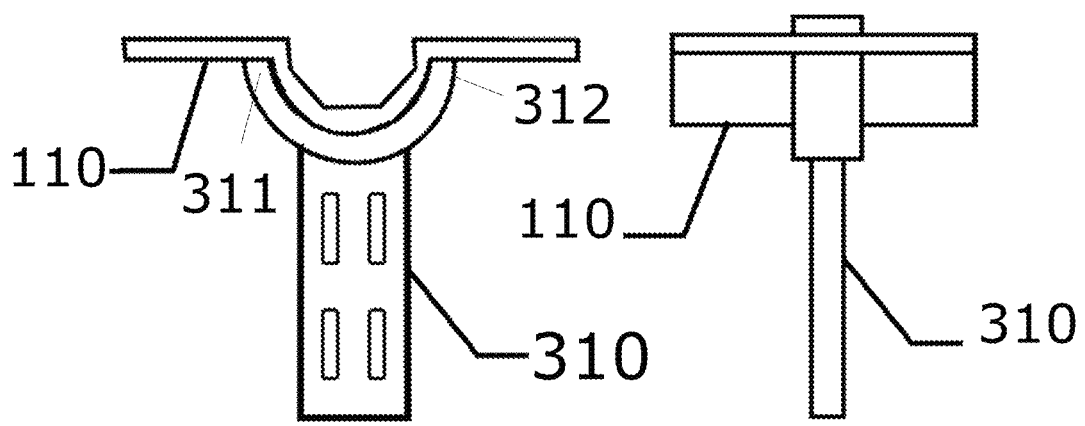
FIG. 5B shows a front view of the first portion of the coupler-journal coupled with the lower bearing portion, according to some embodiments.
FIG. 5C shows a side view of the first portion of the coupler-journal coupled with the lower bearing portion, according to some embodiments.

FIG. 5B shows a front view of the first portion 110 of the coupler-journal coupled with the lower bearing portion 310, according to some embodiments. FIG. 5C shows a side view of the first portion 110 of the coupler-journal coupled with the lower bearing portion 310, according to some embodiments. As shown, the first portion 110 of the coupler-journal, with its faceted concave interior surface facing up, is resting on the bearing surface of the lower bearing portion 310. In one example embodiment, when the flanges of the first portion 110 is horizontal or parallel with a surface (e.g., the ground surface), the upright prongs 311 and 312 are sized to both be equal with, lower than or above the first opening 111 and the second opening 112. When the first portion 110 of the journal-coupler is rotated (e.g., clockwise or counter-clockwise), the upright prongs 311 and 312 remain in a fixed orientation and either pass above or below the respective first opening 111 and the second opening 112 depending on the amount of rotation of the first portion 110.

Figure 6:
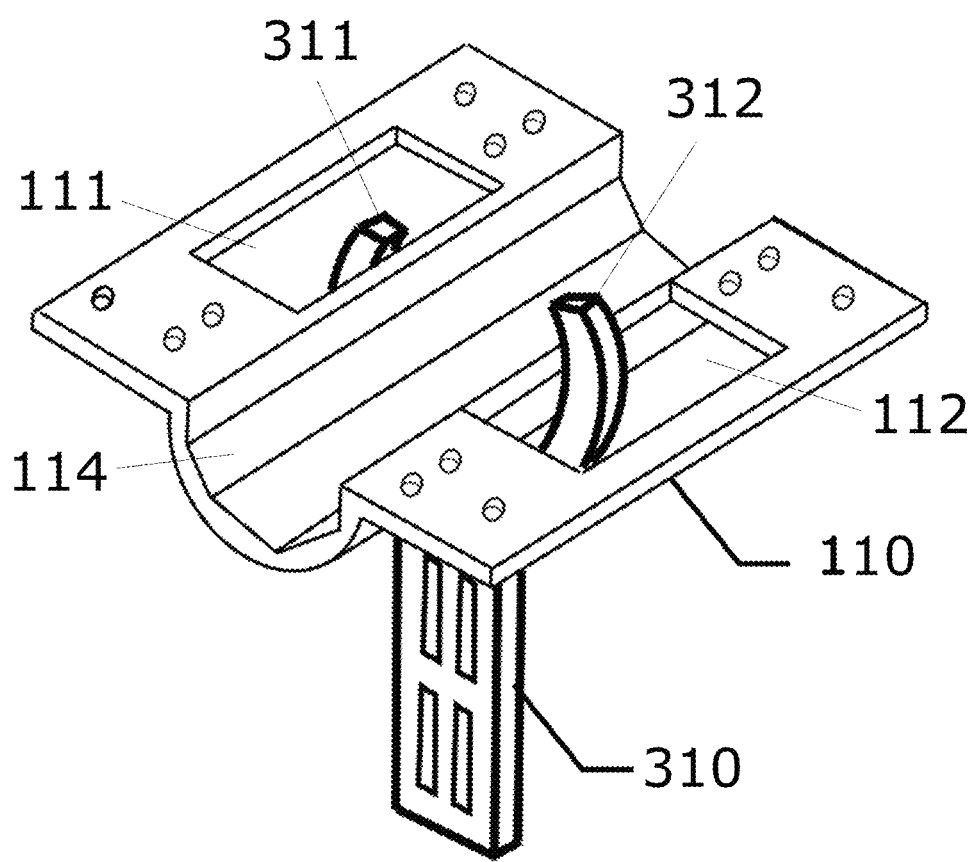
FIG. 6 shows a perspective view of the first portion of the coupler-journal coupled with the lower bearing portion, according to some embodiments.

FIG. 6 shows a perspective view of the first portion 110 of the coupler-journal coupled with the lower bearing portion 310, according to some embodiments. As shown, the lower portion 110 is rotated clockwise such that the upright prong 311 is oriented below the first opening 111 and the upright prong 312 is oriented above the second opening 112.

Figures 7A, 7B:
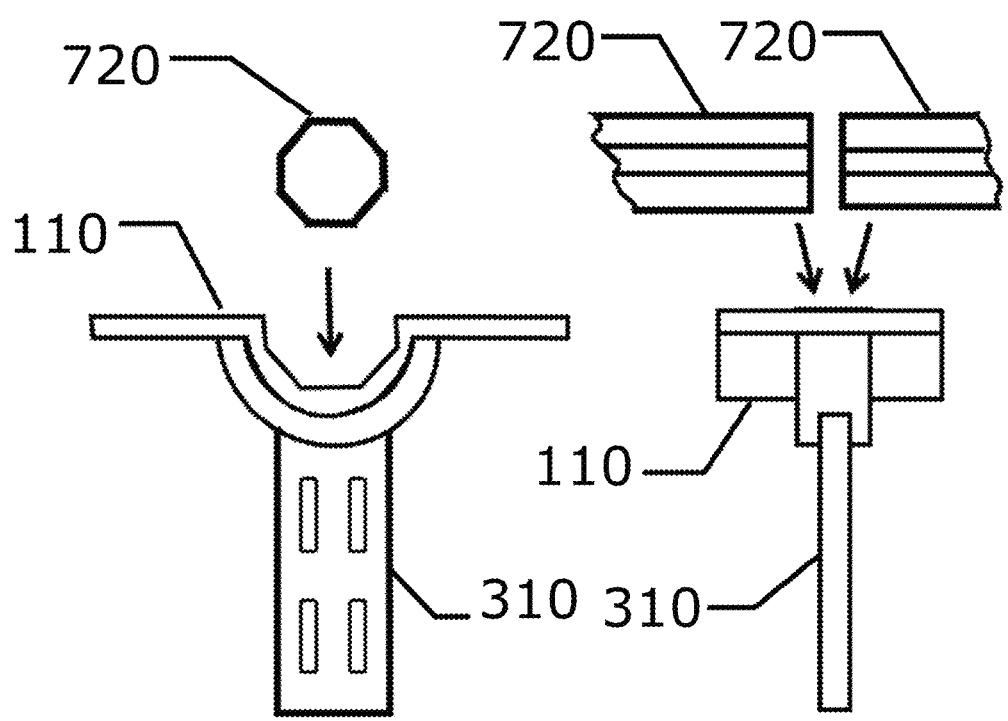
FIG. 7A shows a front view of torque tubes being placed into the first portion of the coupler-journal that is connected with the lower bearing portion, according to some embodiments.
FIG. 7B shows a side view of torque tubes being placed into the first portion of the coupler-journal that is connected with the lower bearing portion, according to some embodiments.

FIG. 7A shows a front view of a torque tube 720 being placed into the first portion 110 of the coupler-journal that is connected with the lower bearing portion 310, according to some embodiments. FIG. 7B shows a side view of the torque tube 720 being placed into the first portion 110 of the coupler-journal that is connected with the lower bearing portion 310, according to some embodiments. As shown in FIG. 7B, there are two end-to-end torque tubes 720 being lowered (in the direction of the arrows) into the faceted concave surface of the first portion 110 of the coupler-journal. In one example, the torque tubes 720 may be manually lowered into the first portion 110 by hand, by a lifting device, etc.

Figures 8A, 8B:
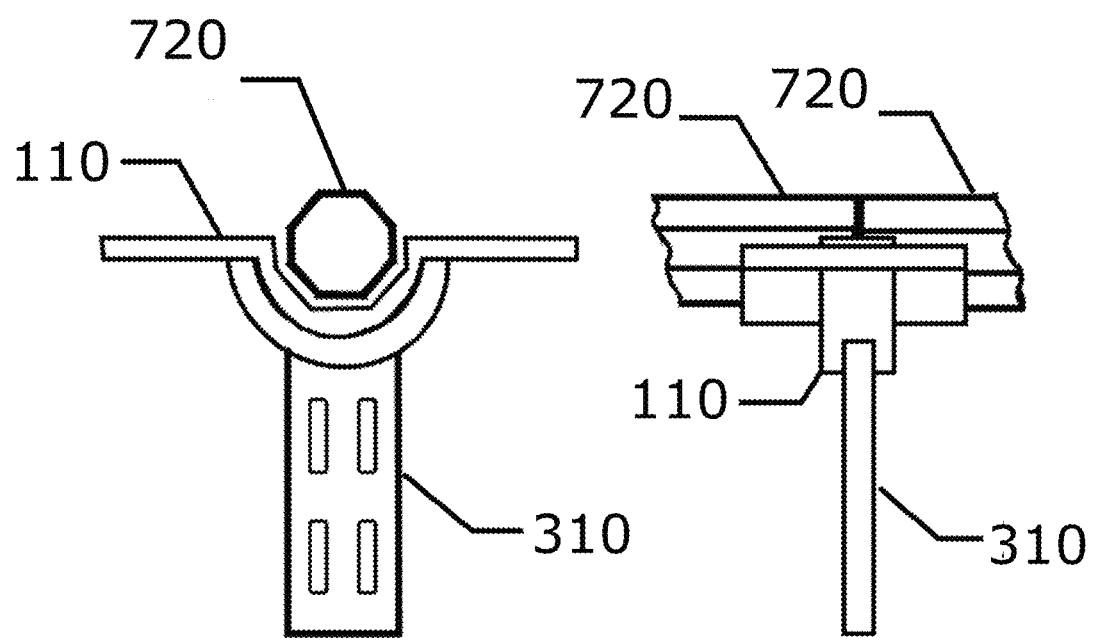
FIG. 8A shows a front view of torque tubes placed within the first portion of the coupler-journal that is connected with the lower bearing portion, according to some embodiments.
FIG. 8B shows a side view of the torque tubes placed within the first portion of the coupler-journal that is connected with the lower bearing portion, according to some embodiments.

FIG. 8A shows a front view of the torque tube 720 connected with the first portion 110 of the coupler-journal that is connected with the lower bearing portion 310, according to some embodiments. FIG. 8B shows a side view of the torque tubes 720 connected with the first portion 110 of the coupler-journal that is connected with the lower bearing portion 310, according to some embodiments. In one or more embodiments, the torque tubes 720 are placed (flush) within the interior portion of the first portion 110 and are sized together with the first portion 110 (and the second portion 120) in order for rotation of the first portion 110 (and the second portion 120) to avoid unnecessary lateral movement of the torque tubes 720 when mounted within the first portion 110 and the second portion 120.

Figures 9A, 9B:
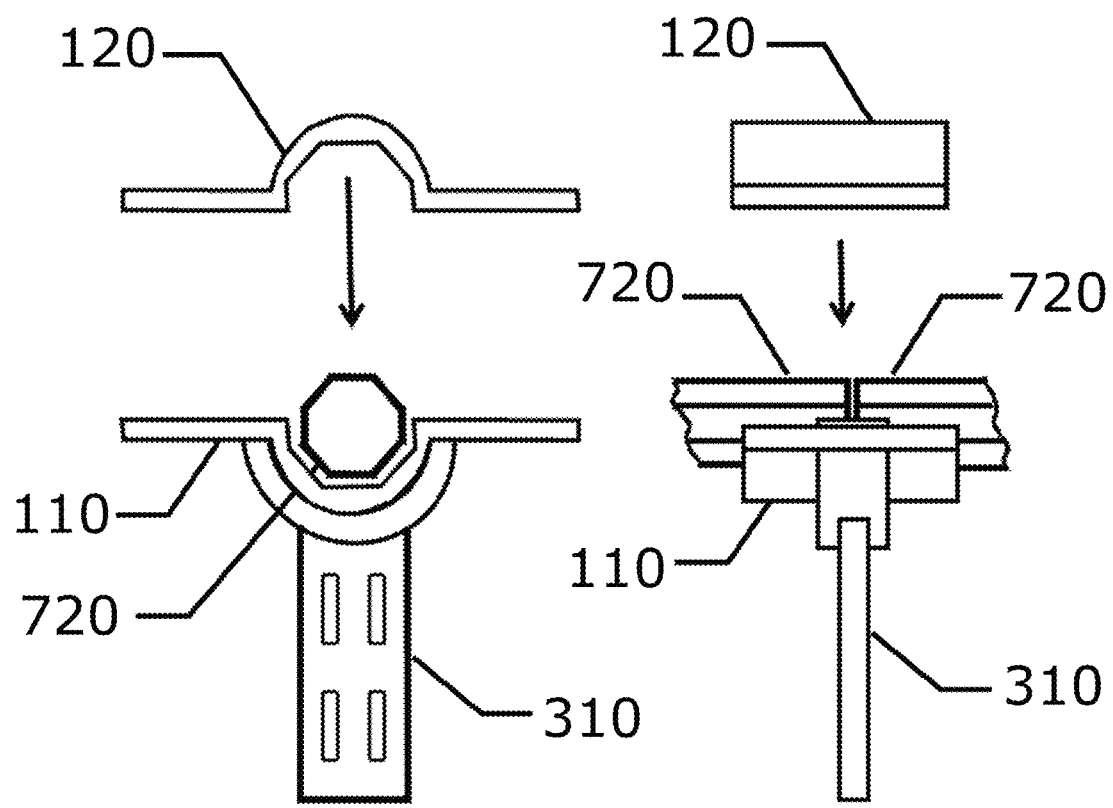
FIG. 9A shows a front view of the second portion of the coupler-journal being placed over torque tubes that are placed within the first portion of the coupler-journal that is connected with the lower bearing portion, according to some embodiments.
FIG. 9B shows a side view of the second portion of the coupler-journal being placed over torque tubes that are placed within the first portion of the coupler-journal that is connected with the lower bearing portion, according to some embodiments.

FIG. 9A shows a front view of the second portion 120 of the coupler-journal being placed over the torque tubes 720 that are placed within the first portion 110 of the coupler-journal that is connected with the lower bearing portion 310, according to some embodiments. FIG. 9B shows a side view of the second portion 120 of the coupler-journal being placed over the torque tubes 720 that are placed within the first portion 110 of the coupler-journal that is connected with the lower bearing portion 310, according to some embodiments. The faceted concave surfaces of the first portion 110 and the second portion 120 are in alignment with the faceted surfaces of the torque tubes 720 to provide non-slip rotation of the torque tubes 720.

Figures 10A, 10B:
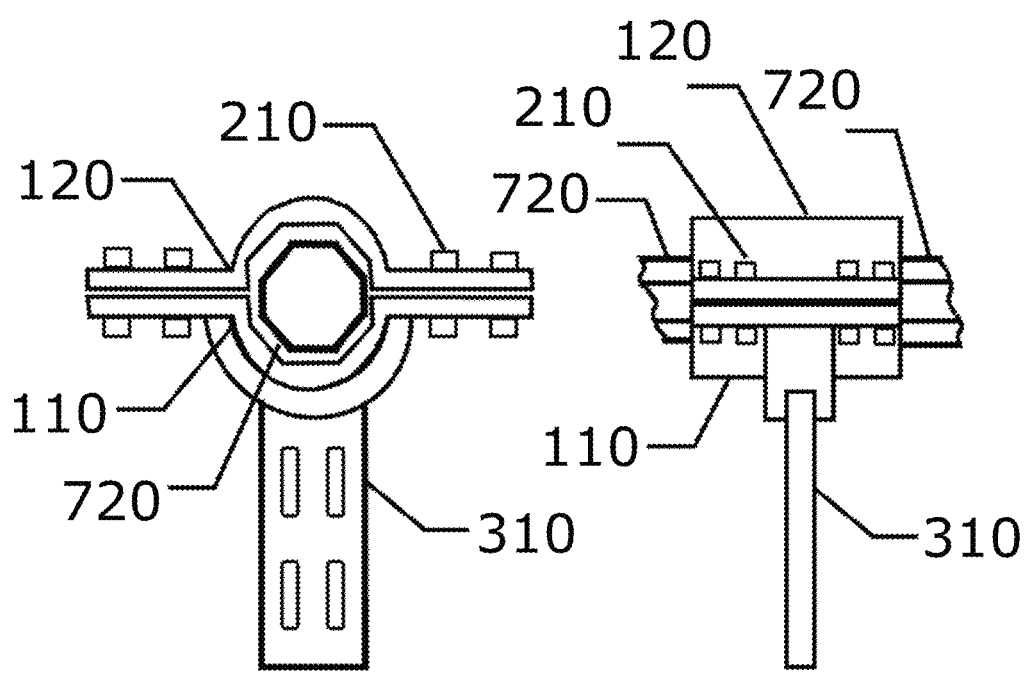
FIG. 10A shows a front view of the second portion of the coupler-journal securely connected with the first portion of the coupler-journal with the torque tubes placed between the first portion and the second portion of the coupler-journal, and the first portion of the journal-coupler is connected with the lower bearing portion, according to some embodiments.
FIG. 10B shows a side view of the second portion of the coupler-journal securely connected with the first portion of the coupler-journal with the torque tubes placed between the first portion and the second portion of the coupler-journal, and the first portion of the journal-coupler is connected with the lower bearing portion, according to some embodiments.

FIG. 10A shows a front view of the second portion 120 of the coupler-journal securely connected with the first portion 110 of the coupler-journal with the torque tubes 720 placed between the first portion 110 and the second portion 120 of the coupler-journal, and the first portion 110 of the journal-coupler is connected with the lower bearing portion 310, according to some embodiments. FIG. 10B shows a side view of the second portion 120 of the coupler-journal securely connected with the first portion 110 of the coupler-journal with the torque tubes 720 placed between the first portion 110 and the second portion 120 of the coupler-journal, and the first portion 110 of the journal-coupler is connected with the lower bearing portion 310, according to some embodiments. In some embodiments, the first portion 110 and the second portion 120 of the coupler-journal are fastened together (e.g., with bolt/washer/nut hardware, etc.) clamping in place the two end-to-end torque tubes 720. The fastening of the two torque tubes 720 provides for transferring the torque from one torque tube 720 to the adjoining torque tube 720, which couples together the two torque tubes 720 for simultaneous rotation when a force is applied to one of the torque tubes 720. The two coupler-journal halves (first portion 110 and the second portion 120) form a fully round and cylindrical journal that rests and rotates inside a smooth (e.g., and round, etc.) bearing surface of the lower bearing portion 310.

Figure 11A:
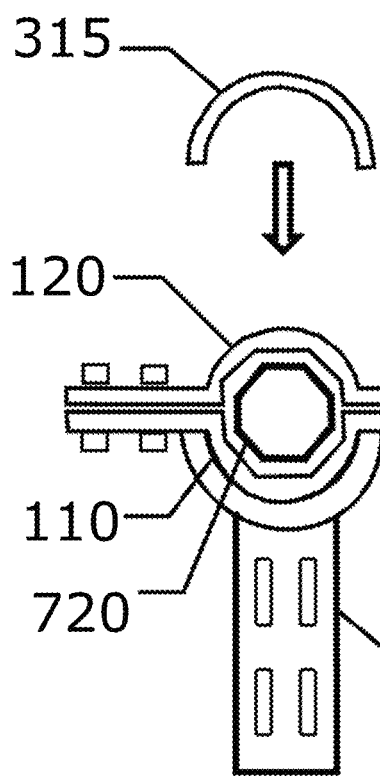
FIG. 11A shows a front view of an upper bearing portion being placed over the second portion of the coupler-journal that is securely connected with the first portion of the coupler-journal with the torque tubes placed between the first portion and the second portion of the coupler-journal, and the first portion of the journal-coupler is connected with the lower bearing portion, according to some embodiments.
Figure 11B:
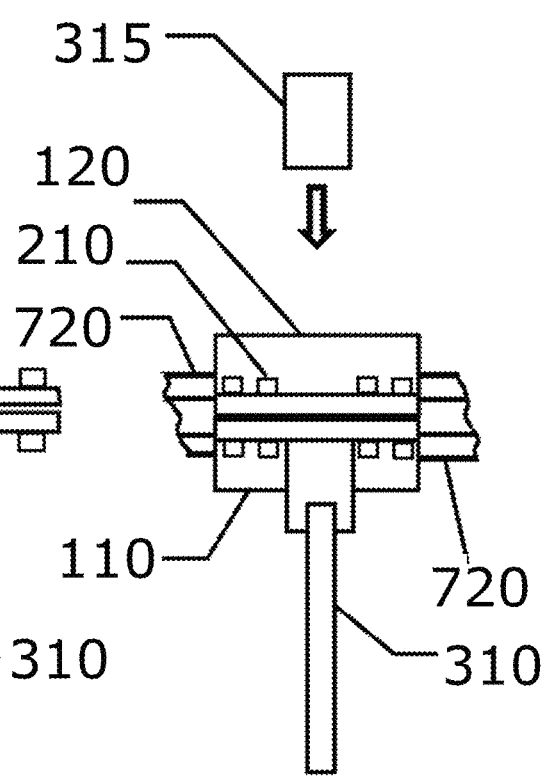
FIG. 11B shows a side view of an upper bearing portion being placed over the second portion of the coupler-journal that is securely connected with the first portion of the coupler-journal with the torque tubes placed between the first portion and the second portion of the coupler-journal, and the first portion of the journal-coupler is connected with the lower bearing portion, according to some embodiments.

FIG. 11A shows a front view of an upper bearing portion 315 being placed over the second portion 120 of the coupler-journal (in the direction of the arrows) that is securely connected with the first portion 110 of the coupler-journal with the torque tubes 720 placed between the first portion 110 and the second portion 120 of the coupler-journal, and the first portion 110 of the journal-coupler is connected with the lower bearing portion 310, according to some embodiments. FIG. 11B shows a side view of an upper bearing portion 315 being placed over the second portion 120 of the coupler-journal that is securely connected with the first portion 110 of the coupler-journal with the torque tubes 720 placed between the first portion 110 and the second portion 120 of the coupler-journal, and the first portion 110 of the journal-coupler is connected with the lower bearing portion 310, according to some embodiments. In one or more embodiments, the upper bearing portion 315 is manually lowered onto the lower bearing portion 310 at the intended interface points on the ends of the two upward (pointing) prongs 311 and 312 (see, e.g., FIGS. 4, 15) of the lower bearing portion 310.

In some embodiments, the lower bearing portion 310 and the upper bearing portion 315 form a bearing housing to hold a rotating journal being composed of the first portion 110 and the second portion 120 that latch/fasten together for assembly and disassembly. In one embodiment, not placing any tension or shear force of the fasteners 210 hardware that keeps the two bearing housing components (the upper bearing portion 315 and the lower bearing portion 310) in alignment. One or more embodiments include the bearing lower portion 310 and the upper bearing portion 315 which when latched together (e.g., fastened, bolted, screwed, etc.) form a bearing housing to hold and maintain a journal for the torque tubes 720 onto which solar panels are mounted.

In some embodiments, the wall thicknesses of the lower bearing portion 310 and the upper bearing portion 315 are thick enough to perform as a bearing race in a simple bearing system for the multi-decade life for which it is intended (e.g., performing as a simple bearing for a single axis tracker which will rotate back and forth daily for thirty years, constituting approximately twenty-two thousand turns). The wall thickness is also sufficient enough to hold the journal and hence the torque tubes 720 and solar panels in place when subjected to gravity forces and wind forces.

In one or more embodiments, the round bearing surface formed by the lower bearing portion 310 and the upper bearing portion 315 maximizes the surface contact to the journal-coupler to minimize pressure at the simple bearing interfaces, and to minimize wear on the embodiments.

Figures 12A, 12B:
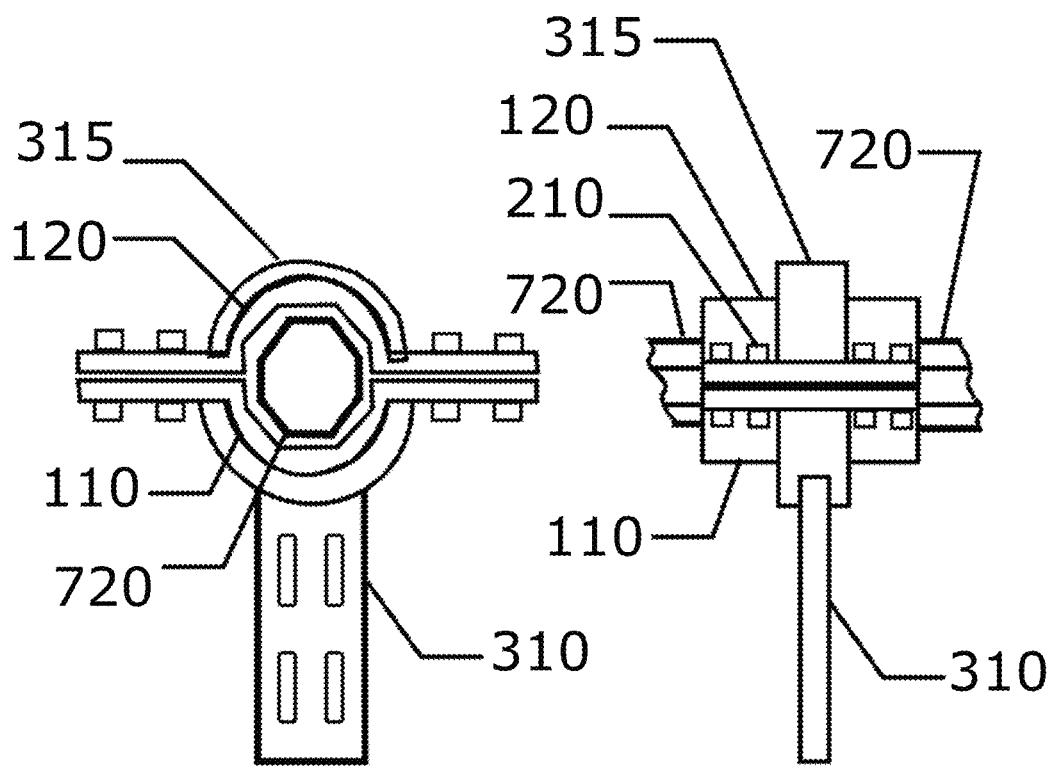
FIG. 12A shows a front view of an upper bearing portion securely connected to the bottom bearing portion, where the second portion of the coupler-journal is securely connected with the first portion of the coupler-journal with the torque tubes placed between the first portion and the second portion of the coupler-journal, and the first portion of the journal-coupler is connected with the lower bearing portion, according to some embodiments.
FIG. 12B shows a side view of an upper bearing portion securely connected to the bottom bearing portion, where the second portion of the coupler-journal is securely connected with the first portion of the coupler-journal with the torque tubes placed between the first portion and the second portion of the coupler-journal, and the first portion of the journal-coupler is connected with the lower bearing portion, according to some embodiments.

FIG. 12A shows a front view of the upper bearing portion 315 securely connected to the lower bearing portion 310, where the second portion 120 of the coupler-journal is securely connected with the first portion 110 of the coupler-journal with the torque tubes 720 placed between the first portion 110 and the second portion 120 of the coupler-journal, and the first portion 110 of the coupler-journal is connected with the lower bearing portion 310, according to some embodiments. FIG. 12B shows a side view of the upper bearing portion 315 securely connected to the lower bearing portion 310, where the second portion 120 of the coupler-journal is securely connected with the first portion 110 of the coupler-journal with the torque tubes 720 placed between the first portion 110 and the second portion 120 of the coupler-journal, and the first portion 110 of the coupler-journal is connected with the lower bearing portion 310, according to some embodiments.

In some embodiments, the upper bearing portion 315 attached to the lower bearing portion 310 forms a fully circular bearing with a 360° round, smooth, and simple bearing surface. The formed bearing guides and retains the coupler-journal and hence the torque tubes 720, forming a simple bearing. The simple bearing sustains loads from gravity, wind, and seismic forces that act on the torque tubes 720, both as a directional force and as a torsional force. In some embodiments, the simple bearing also forms an electrical ground path between the formed bearing and the coupler-journal via constant metal to metal contact and under continuous interface pressure of which undergoes daily surface-to-surface interface wiping from the two approximate ninety-degree rotations (90 degree turning during sun tracking and back-tracking, and 90 degree return turn) per day.

Figure 13:
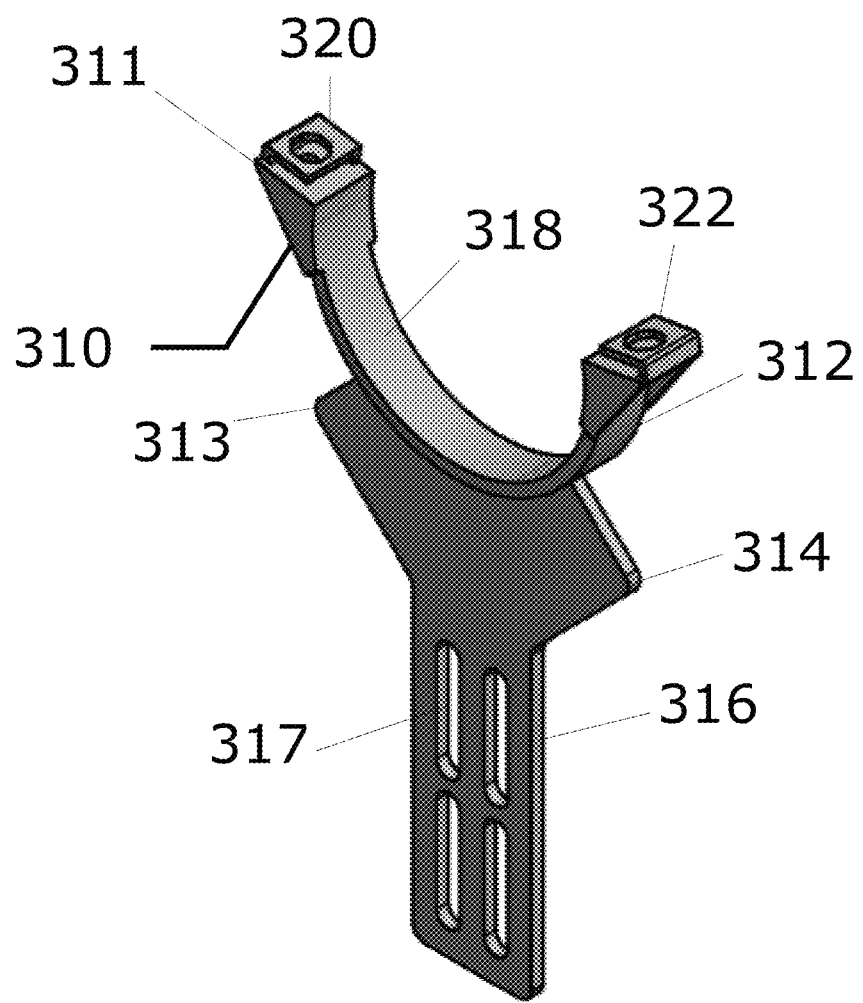
FIG. 13 shows a perspective isolated view of the lower bearing portion, according to some embodiments.

FIG. 13 shows a perspective isolated view of the lower bearing portion 310, according to some embodiments. The lower bearing portion 310 includes the upright prongs 311 and 312, pier insert stops 313 and 314, pier insert portion 316 and fastening slots 317. The bearing surface forms a smooth semi-circle. The upright prongs 311 and 312 terminate with the latching portions 320 and 322 including through-holes to house, for example, fasteners, bolts/screws/etc., that captures the upper bearing portion 315.

Figure 14A:
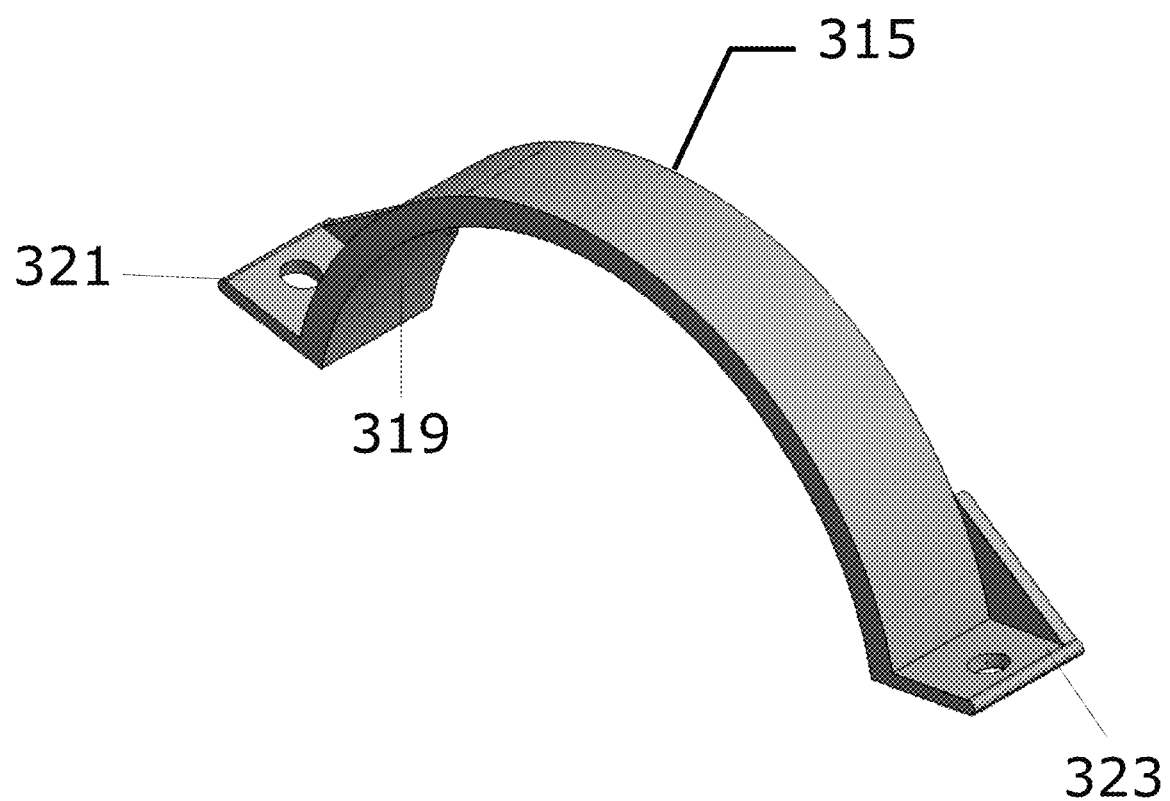
FIG. 14A shows a front perspective isolated view of the upper bearing portion, according to some embodiments.

FIG. 14A shows a front perspective isolated view of the upper bearing portion 315, according to some embodiments. The bearing surface 319 forms a smooth semi-circle. The two protruding flat flanges 321 and 323 at the bottom of the two ends of the upper bearing portion 315 are designed to slide into a capture feature of the latching portions 320 and 322 (FIG. 13) of the lower bearing portion 310. In one or more embodiments, a gusset 325 (FIG. 14B) is added to flange 321, and a gusset 324 (FIG. 14B) is added (e.g., welded, formed/molded, fastened (e.g., screws, bolts, etc.)) to flange 323 to give additional strength to the flanges 321 and 323 when a pull force is applied to the upper bearing portion 315. Only one gusset is attached per side to allow the bearing upper portion 315 to slide sideways into the latching portions 320 and 322 of the lower bearing portion 310.

Figure 14B:
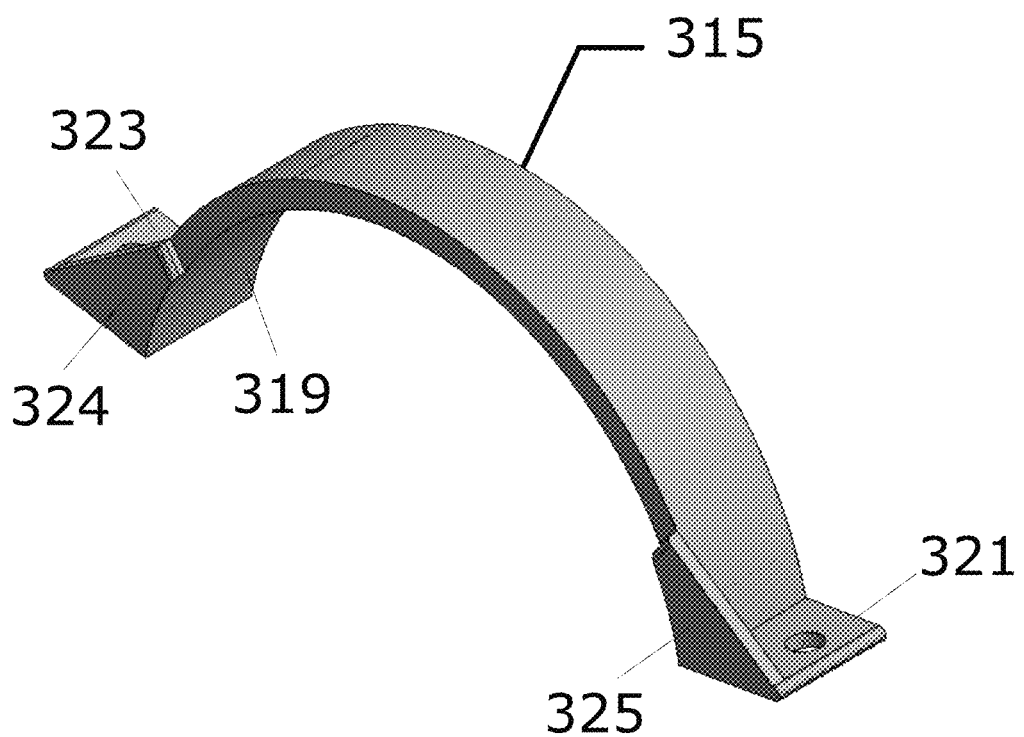
FIG. 14B shows a rear perspective isolated view of the upper bearing portion, according to some embodiments.

FIG. 14B shows a rear perspective isolated view of the upper bearing portion 315, according to some embodiments. The gussets 324 and 235 help hold the two flanges 321 and 323 in place.

Figure 15:
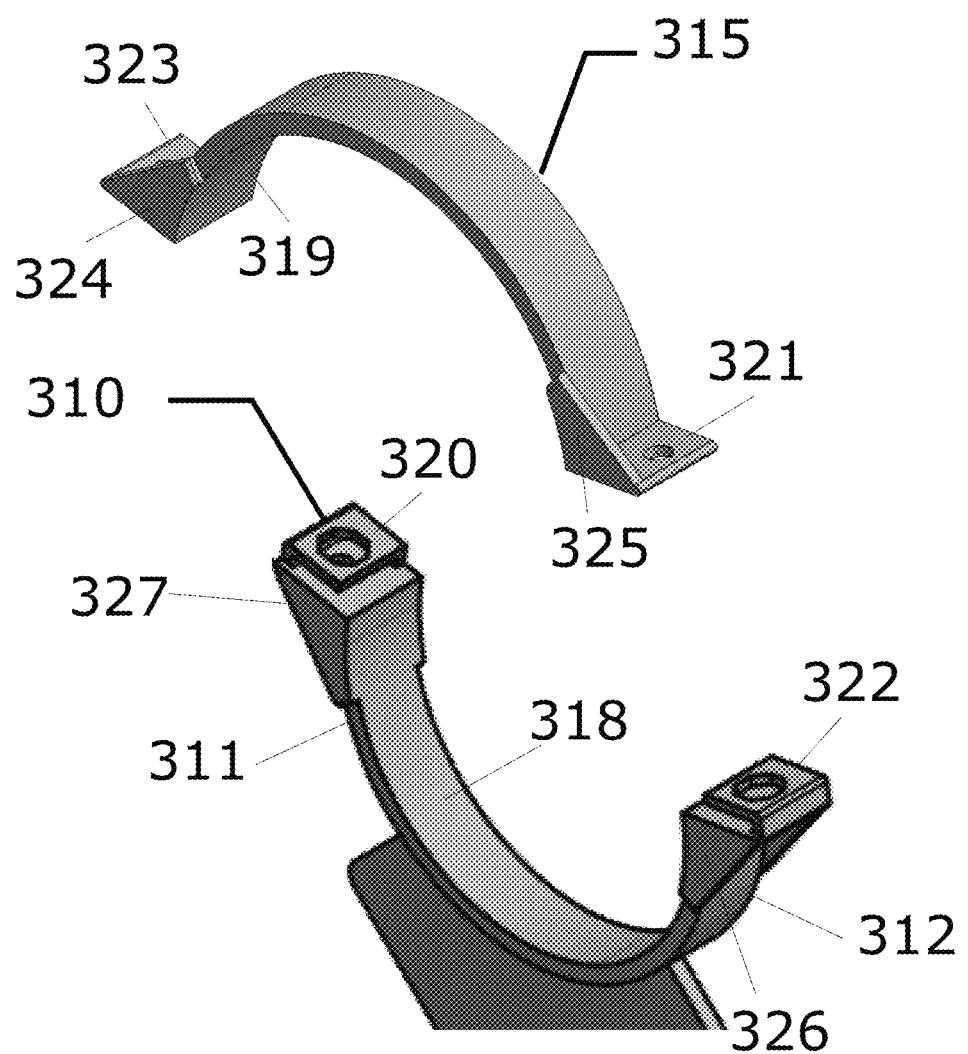
FIG. 15 shows a combined perspective view of the upper bearing portion and the lower bearing portion, according to some embodiments.

FIG. 15 shows a combined perspective view of the upper bearing portion 315 and the lower bearing portion 310, according to some embodiments. As shown, the upper bearing portion 315 and the lower bearing portion 310 are in a near-ready attachment position. The upper bearing portion 315 is lowered to the lower bearing portion 310 so that the two flanges 321 and 323 of the upper bearing portion 315 are just to the side of and in-line with the latching portions 320 and 322 of the lower bearing portion 310, and then moved sideways in one direction only so that the two flanges 321 and 323 of the upper bearing portion 315 slide into the latching portions 322 and 320, respectively, of the lower bearing portion 310 until the sliding action is stopped by the gussets 324 and 325 on the upper bearing portion 315 and the gussets 326 and 327 of the lower bearing portion 310 are positioned such that the fastening through-holes of both the upper bearing portion 315 and the lower bearing portion 310 are aligned.

Figure 16:
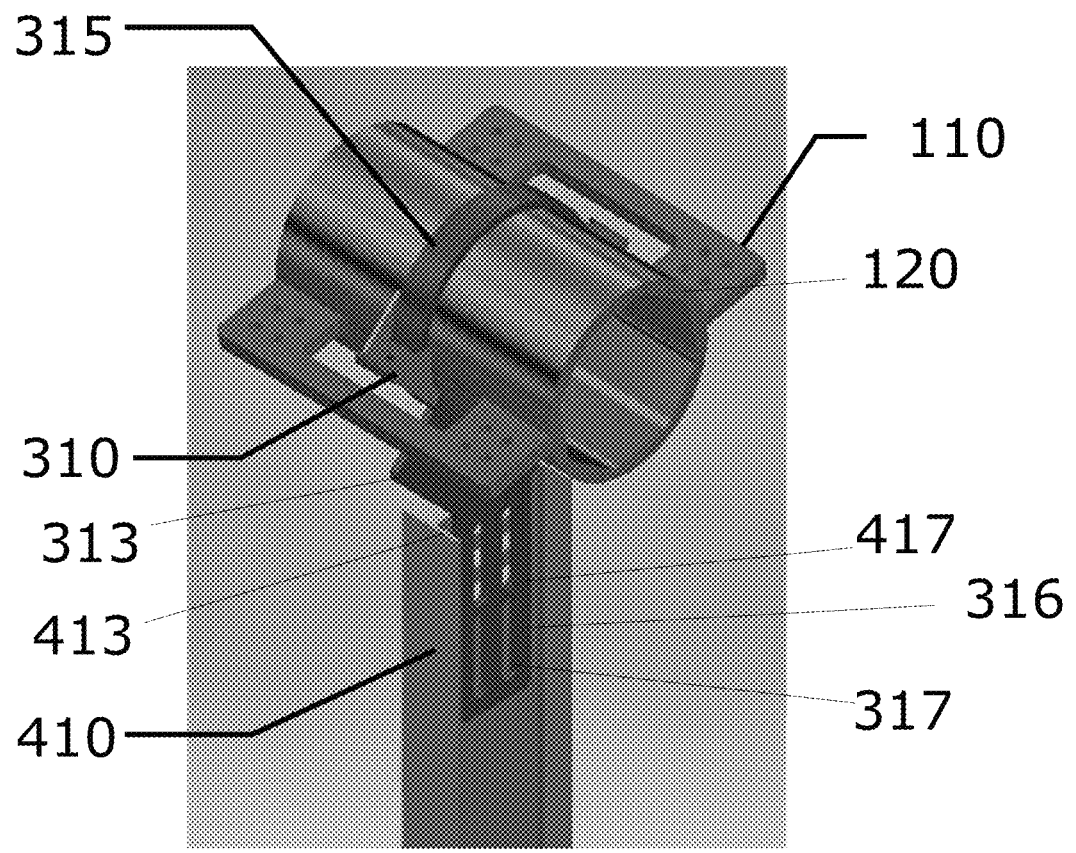
FIG. 16 shows a perspective view of the coupler-journal coupled with the upper bearing portion securely connected to the lower bearing portion that is connected to a pier, according to some embodiments.

FIG. 16 shows a perspective view of the coupler-journal coupled with the upper bearing portion 315 securely connected to the lower bearing portion 310 that is connected to a pier 410, according to some embodiments. The second portion 120 of the coupler-journal is securely connected with the first portion 110 of the coupler-journal, and the first portion 110 of the journal-coupler is connected with the lower bearing portion 310. In some embodiments, the pier 410 includes an upper pier portion 413 and coupling slots 417. The upper pier portion 413 may contact the pier insert stops 313 and 314 (FIG. 13), for example to provide clearance for rotation movement of the coupler-journal. The pier insert portion 316 is fastened using the coupling slots 417 aligned with fastening slots 317 using fasteners such as bolts and nuts, screws, welding, etc.

In some embodiments, the upper bearing portion 315 and the lower bearing portion 310 latch together to form one bearing housing. The latching portions 320 and 322 (FIG. 13) of the bearing absorb all of the separation forces for keeping the major forces off of the fastening hardware. The bearing is a two-component (lower bearing portion 310 and the upper bearing portion 315) system by which a torque tube 720 (see, e.g., FIGS. 7A-B-12A-B) or an axle may be lowered and quickly placed into the lower bearing portion 310. The upper bearing portion 315 is then quickly attached to the lower bearing portion 310. In one example embodiment, a fastener can then be dropped into place to aid in keeping the latching portions 320 and 322 of the bearing in alignment and in place. One advantage of this latching is that there is no force, either in shear or in tension, on the fastener (e.g., a threaded bolt and nut hardware, etc.). Another advantage of the latching bearing system is that the mechanical parts of a single axis tracking system can be easily disassembled and reworked if needed simply by removing the upper bearing portion 315 of the bearing housing.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of pre-AIA 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A journal-coupler comprising:
    a first portion including a first pair of flanges and a first coupler portion;
    a second portion removably coupled to the first portion, the second portion including a second pair of flanges and a second coupler portion;
    an upper bearing portion; and
    a lower bearing portion removably coupled to the upper bearing portion, the lower bearing portion comprising:
    a pair of stop portions;
    a pier insert portion including fastening slots; and
    a first prong including a first latching portion;
    wherein the first coupler portion and the second coupler portion combine as an enclosed torque tube portion and couple over a first torque tube and a second torque tube.

2. The journal-coupler of claim 1,
    the first torque tube and the second torque tube each have one of a multi-faceted shape or a cylindrical shape;
    the upper bearing portion combined with the lower bearing portion form a bearing enclosure.

3. The journal-coupler of claim 2, wherein the first portion comprises a first opening and a second opening, the second portion comprises a third opening and a fourth opening, and the upper bearing portion, the first portion, the first torque tube, the second torque tube, the second portion and the lower bearing portion are each made of an electrical conductive material.

4. The journal-coupler of claim 3, wherein the first portion includes a first semi-circular exterior portion, the second portion includes a second semi-circular exterior portion, and the first semi-circular exterior portion and the second semi-circular exterior portion combine for enclosure by the bearing enclosure.

5. The journal-coupler of claim 3, wherein the lower bearing portion further comprises:
    a second prong including a second latching portion.

6. The journal-coupler of claim 5, wherein:
    the upper bearing portion comprises a pair of gussets.

7. The journal-coupler of claim 5, wherein:
    the combined first portion and the second portion is configured to rotate within the bearing enclosure; and
    the first pair of flanges and the second pair of flanges each comprise a plurality of fastening through-holes configured for receiving fasteners that couple the first portion with the second portion.

8. The journal-coupler of claim 7, wherein:
    the first opening and the third opening align to form a first window;
    the second opening and the fourth opening align to form a second window;
    the lower bearing portion and the upper bearing portion couple together through the first window and the second window; and
    the pier insert portion is configured for attachment with a pier.

9. A journal-coupler system comprising:
    a first portion including a first pair of flanges and a first coupler portion;
    a second portion removably coupled to the first portion, the second portion including a second pair of flanges and a second coupler portion;
    an upper bearing portion comprising a pair of gussets; and
    a lower bearing portion removably coupled to the upper bearing portion, the lower bearing portion comprising:
    a pier insert portion including fastening slots; and
    a first prong including a first latching portion;
    wherein the upper bearing portion and the lower bearing portion combine as a bearing enclosure for the first portion and the second portion, the first portion and the second portion couple over a first torque tube and a second torque tube.

10. The journal-coupler system of claim 9, wherein:
the first torque tube and the second torque tube each have one of a multi-faceted shape or a cylindrical shape;
the first coupler portion and the second coupler portion each having one of a multi-faceted shape or a cylindrical shape, and are configured to enclose the first torque tube and second torque tube;
the first portion comprises a first opening and a second opening; and
the second portion comprises a third opening and a fourth opening.

11. The journal-coupler system of claim 10, wherein:
the first portion includes a first semi-circular exterior portion;
the second portion includes a second semi-circular exterior portion; and
the first semi-circular exterior portion and the second semi-circular exterior portion combine for enclosure by the bearing enclosure.

12. The journal-coupler system of claim 10, wherein the lower bearing portion further comprises:
a second prong including a second latching portion.

13. The journal-coupler system of claim 12, wherein:
the lower bearing portion further comprises a pair of stop portions.

14. The journal-coupler system of claim 12, wherein:
the combined first portion and the second portion is configured to rotate within the bearing enclosure; and
the first pair of flanges and the second pair of flanges each comprise a plurality of fastening through-holes configured for receiving fasteners that couple the first portion with the second portion.

15. The journal-coupler system of claim 14, wherein:
the first opening and the third opening align to form a first window;
the second opening and the fourth opening align to form a second window;
the lower bearing portion and the upper bearing portion couple together through the first window and the second window; and
the pier insert portion is configured for attachment with a pier.

16. A system for solar panel tracking, the system comprising:
a journal-coupler including:
a first portion including a first pair of flanges and a first coupler portion; and
a second portion removably coupled to the first portion, the second portion including a second pair of flanges and a second coupler portion;
a bearing enclosure including:
an upper bearing portion; and
a lower bearing portion removably coupled to the upper bearing portion, the lower bearing portion comprising:
a pair of stop portions;
a pier insert portion including fastening slots; and
a first prong including a first latching portion; and
a first torque tube and a second torque tube each configured for coupling with one or more solar panels;
wherein the upper bearing portion and the lower bearing portion combine as the bearing enclosure for the journal-coupler and couple over the first torque tube and the second torque tube.

17. The system of claim 16, wherein:
the first torque tube and the second torque tube each have one of a multi-faceted shape or a cylindrical shape;
the first coupler portion and the second coupler portion combine to form an enclosed torque tube portion that receives a portion of the first torque tube and portion of the second torque tube to enclose the first torque tube and the second torque tube;
the first portion comprises a first opening and a second opening; and
the second portion comprises a third opening and a fourth opening.

18. The system of claim 17, wherein:
the first portion includes a first semi-circular exterior portion;
the second portion includes a second semi-circular exterior portion;
the first semi-circular exterior portion and the second semi-circular exterior portion combine for enclosure by the bearing enclosure; and
the lower bearing portion further comprises:
a second prong including a second latching portion.

19. The system of claim 18, wherein:
the upper bearing portion comprises a pair of gussets;
the journal-coupler is configured to rotate within the bearing enclosure; and
the first pair of flanges and the second pair of flanges each comprise a plurality of fastening through-holes configured for receiving fasteners that couple the first portion with the second portion.

20. The system of claim 19, wherein:
the first opening and the third opening align to form a first window;
the second opening and the fourth opening align to form a second window;
the lower bearing portion and the upper bearing portion couple together through the first window and the second window; and
the pier insert portion is configured for attachment with a pier.

* * * * *